V. W. YOUNG.
FRUIT PICKER.
APPLICATION FILED MAY 23, 1916.
1,225,097.
Patented May 8, 1917.
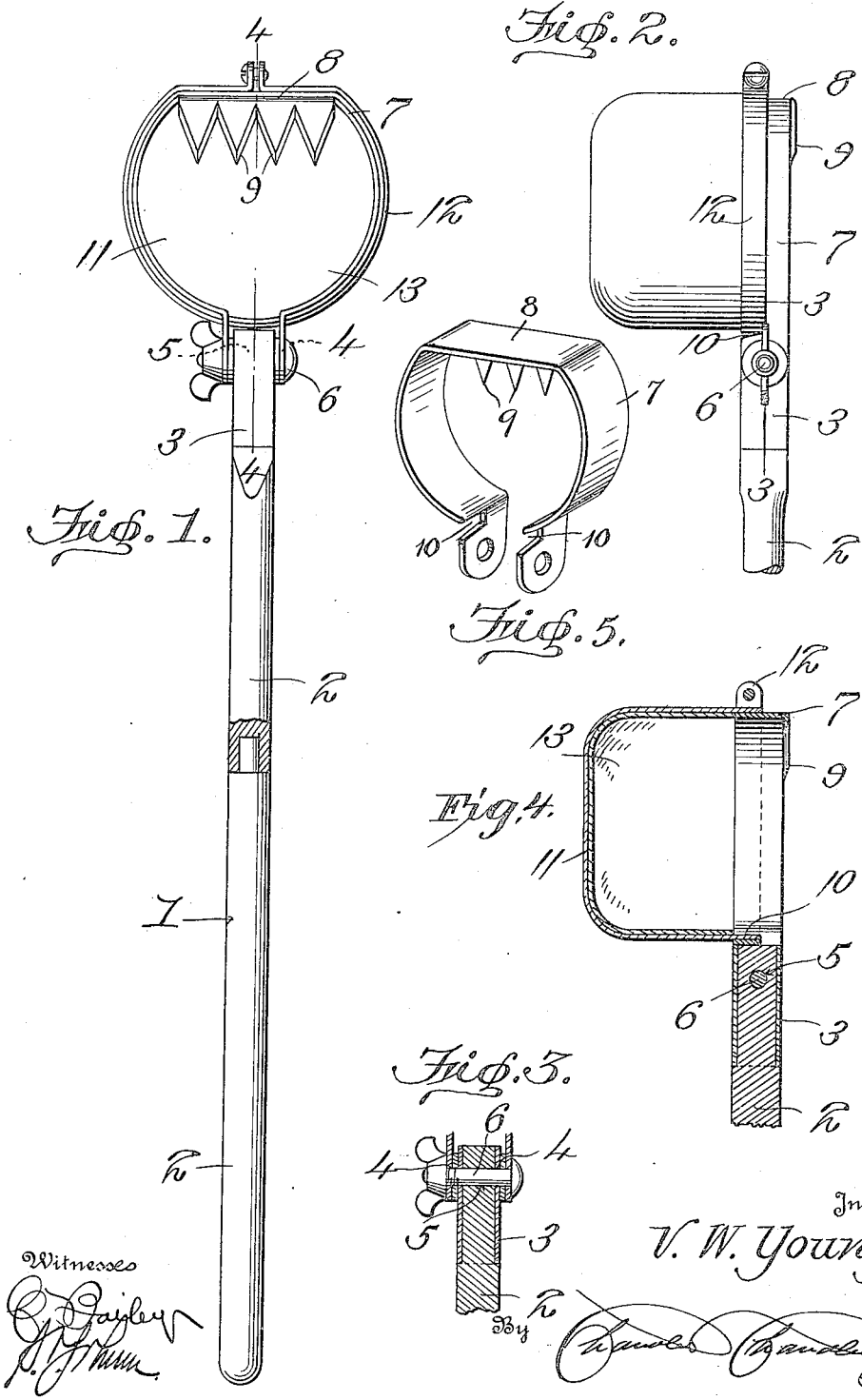
Witnesses
Inventor
V. W. Young,
By
Attorneys

UNITED STATES PATENT OFFICE.

VALNER W. YOUNG, OF ABILENE, TEXAS.

FRUIT-PICKER.

1,225,097.　　　　　Specification of Letters Patent.　　　Patented May 8, 1917.

Application filed May 23, 1916. Serial No. 99,354.

*To all whom it may concern:*

Be it known that I, VALNER W. YOUNG, a citizen of the United States, residing at Abilene, in the county of Taylor, State of Texas, have invented certain new and useful Improvements in Fruit-Pickers; and I do hereby declare the following to be a full, clear, and exact description of the invention, such as will enable others skilled in the art to which it appertains to make and use the same.

The present invention is directed to improvements in fruit pickers, and has for its object to provide a device of this character so constructed that the stems of the fruit can be conveniently severed from the fruit while the operator stands upon the ground.

A further object of the invention is to provide a fruit picker constructed in such a manner that the fruit after being picked will fall into a receptacle so as to prevent bruising of the fruit.

A still further object of the invention is to provide a fruit picker so constructed that the cutting teeth can be adjusted in different angular relations with respect to the handle.

With these and other objects in view, this invention resides in the novel features of construction, formation, combination and arrangement of parts to be hereinafter more fully described and claimed and illustrated in the accompanying drawing, in which:—

Figure 1 is a front view of the device.

Fig. 2 is a side elevation.

Fig. 3 is a sectional view on line 3—3 of Fig. 2.

Fig. 4 is a sectional view on line 4—4 of Fig. 1.

Fig. 5 is a perspective view of the head.

Refering to the drawing 1 indicates the handle, which consists of sections 2, said sections being detachably connected so that the handle can be lengthened or shortened as desired. The uppermost section 2 has secured thereto a metallic sleeve 3, said sleeve having openings 4 formed therein which register with the openings 5 formed in the associated section 2, and engaged in said openings is a clamping bolt 6, the purpose of which will appear later.

The head 7 is formed from sheet metal and is substantially U-shaped in contour, and has its arms pivotally connected to the bolt 6, whereby said head can be swung to any desired adjusted position.

The top portion of the head 7 is straight, as at 8 and has one of its edges terminating in a plurality of V-shaped cutting blades 9, which are disposed at right angles to the top portion.

The arms of the head 7 are provided with kerfs 10 which receive the edge of the receptacle 11, said receptacle being shaped substantially as the head 7, and is held in engagement therewith by a clamping band 12. The receptacle 11 is preferably formed from aluminum and has its inner surface covered with a lining 13 which will positively prevent bruising of the fruit as it falls into the receptacle.

In operation the head is placed adjacent the fruit so that the stem thereof will be engaged by the cutting blades 9, whereupon the device is moved downwardly so that the blades will sever the stem with the result that the fruit will drop into the receptacle 11.

What is claimed is:—

1. A fruit picker comprising a handle, a head consisting of a single piece of sheet metal bent into substantially U-shaped form and having its arms pivotally and adjustably connected to the handle, a receptacle engaged with the outside of the head, the top portion of said head having one of its edges formed with cutting blades which are disposed at right angles to the top portion of the head and a band encircling the receptacle and having a part engaged with the head to hold the receptacle clamped thereto.

2. A fruit picker comprising a handle, a head consisting of a single piece of metal bent into a substantially U-shaped form and having its arms pivotally and adjustably connected to the handle, a receptacle engaged with the outside of the head, said arms having kerfs formed therein, and a clamping band encircling the receptacle and having a part removably engaged in said kerfs, the top portion of said head having one of its edges formed with cutting blades which are disposed at right angles to said top portion of the head.

In testimony whereof, I affix my signature, in the presence of two witnesses.

VALNER W. YOUNG.

Witnesses:
V. E. MANS,
HARRY O. BROWN.